(12) United States Patent
Shackelford et al.

(10) Patent No.: US 7,660,958 B2
(45) Date of Patent: *Feb. 9, 2010

(54) MAINTAINING CONSISTENCY FOR REMOTE COPY USING VIRTUALIZATION

(75) Inventors: David Michael Shackelford, Tucson, AZ (US); Gregory Edward McBride, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/266,408

(22) Filed: Nov. 6, 2008

(65) Prior Publication Data

US 2009/0055610 A1   Feb. 26, 2009

Related U.S. Application Data

(63) Continuation of application No. 10/754,231, filed on Jan. 9, 2004, now Pat. No. 7,478,211.

(51) Int. Cl.
    *G06F 12/00* (2006.01)
    *G06F 13/00* (2006.01)
    *G06F 13/28* (2006.01)
    *G06F 17/30* (2006.01)

(52) U.S. Cl. .................. 711/162; 711/141; 711/161; 707/203; 707/204

(58) Field of Classification Search ............... 711/141, 711/161–162, 202, 210, 221; 707/200–206
See application file for complete search history.

(56) References Cited

U.S. PATENT DOCUMENTS

| 4,853,843 | A | 8/1989 | Ecklund |
| 5,193,184 | A | 3/1993 | Belsan et al. |
| 5,446,871 | A | 8/1995 | Shomler et al. |
| 5,499,367 | A | 3/1996 | Bamford et al. |
| 5,504,899 | A | 4/1996 | Raz |
| 5,555,371 | A | 9/1996 | Duyanovich et al. |
| 5,592,618 | A | 1/1997 | Micka et al. |

(Continued)

FOREIGN PATENT DOCUMENTS

EP      0674263      9/1995

(Continued)

OTHER PUBLICATIONS

Amza, C. et al. "Distributed Versioning: Consistent Replication for Scaling Back-End Databases of Dynamic Content Web Sites", Middleware 2003, LNCS 2672, Springer, Berlin, Germany, 2003, pp. 282-304.

(Continued)

*Primary Examiner*—Sanjiv Shah
*Assistant Examiner*—Yaima Campos
(74) *Attorney, Agent, or Firm*—Rabindranath Dutta; Konrad Raynes & Victor, LLP

(57) ABSTRACT

Provided are a system and article of manufacture for copying storage, wherein a first unit receives data updates from a second unit. The data updates are stored in a plurality of physical storage locations associated with the first unit. Links are generated to at least one of the plurality of physical storage locations to achieve consistent data between the first unit and the second unit.

10 Claims, 9 Drawing Sheets

U.S. PATENT DOCUMENTS

| | | | |
|---|---|---|---|
| 5,592,625 | A | 1/1997 | Sandberg |
| 5,682,513 | A | 10/1997 | Candelaria et al. |
| 5,687,343 | A | 11/1997 | Fecteau et al. |
| 5,701,480 | A | 12/1997 | Raz |
| 5,734,818 | A | 3/1998 | Kern et al. |
| 5,765,171 | A | 6/1998 | Gehani et al. |
| 5,806,074 | A | 9/1998 | Souder et al. |
| 5,850,522 | A | 12/1998 | Wlaschin |
| 5,893,117 | A | 4/1999 | Wang |
| 5,895,499 | A | 4/1999 | Chu |
| 5,896,492 | A | 4/1999 | Chong, Jr. |
| 5,924,096 | A | 7/1999 | Draper et al. |
| 5,999,931 | A | 12/1999 | Breitbart et al. |
| 6,032,216 | A | 2/2000 | Schmuck et al. |
| 6,035,412 | A | 3/2000 | Tamer et al. |
| 6,085,200 | A | 7/2000 | Hill et al. |
| 6,105,078 | A | 8/2000 | Crockett et al. |
| 6,131,148 | A | 10/2000 | West et al. |
| 6,148,383 | A | 11/2000 | Micka et al. |
| 6,151,607 | A | 11/2000 | Lomet |
| 6,157,991 | A | 12/2000 | Arnon |
| 6,173,377 | B1 | 1/2001 | Yanai et al. |
| 6,182,195 | B1 | 1/2001 | Laudon et al. |
| 6,185,663 | B1 | 2/2001 | Burke |
| 6,269,382 | B1 | 7/2001 | Cabrera et al. |
| 6,301,643 | B1 | 10/2001 | Crockett et al. |
| 6,321,276 | B1 | 11/2001 | Forin |
| 6,438,558 | B1 | 8/2002 | Stegelmann |
| 6,438,586 | B1 | 8/2002 | Hass et al. |
| 6,442,706 | B1 | 8/2002 | Wahl et al. |
| 6,463,501 | B1 | 10/2002 | Kern et al. |
| 6,487,645 | B1 | 11/2002 | Clark et al. |
| 6,490,594 | B1 | 12/2002 | Lomet |
| 6,493,727 | B1 | 12/2002 | Huang et al. |
| 6,513,051 | B1 | 1/2003 | Bolosky et al. |
| 6,532,527 | B2 | 3/2003 | Selkirk et al. |
| 6,539,462 | B1 | 3/2003 | Mikkelsen et al. |
| 6,611,901 | B1 | 8/2003 | Micka et al. |
| 6,671,705 | B1 | 12/2003 | Duprey et al. |
| 6,789,122 | B1 | 9/2004 | Slaughter et al. |
| 6,799,255 | B1 | 9/2004 | Blumenau et al. |
| 6,804,755 | B2 | 10/2004 | Selkirk et al. |
| 6,898,609 | B2 | 5/2005 | Kerwin |
| 6,898,685 | B2 | 5/2005 | Meiri et al. |
| 6,925,528 | B2 | 8/2005 | Selkirk et al. |
| 7,051,176 | B2 | 5/2006 | Meiri et al. |
| 7,111,136 | B2 | 9/2006 | Yamagami |
| 7,155,586 | B1 | 12/2006 | Wagner et al. |
| 7,278,049 | B2 * | 10/2007 | Bartfai et al. ............... 714/6 |
| 7,305,421 | B2 | 12/2007 | Cha et al. |
| 7,475,199 | B1 | 1/2009 | Bobbitt et al. |
| 2002/0087780 | A1 | 7/2002 | Selkirk et al. |
| 2002/0120763 | A1 | 8/2002 | Miloushev et al. |
| 2002/0178162 | A1 | 11/2002 | Ulrich et al. |
| 2002/0178335 | A1 | 11/2002 | Selkirk et al. |
| 2003/0217115 | A1 | 11/2003 | Rowlands |
| 2004/0078658 | A1 | 4/2004 | Park et al. |
| 2004/0111390 | A1 | 6/2004 | Saito et al. |
| 2004/0193816 | A1 | 9/2004 | Meiri et al. |
| 2004/0193820 | A1 | 9/2004 | Meiri et al. |
| 2004/0268067 | A1 | 12/2004 | Yamagami |
| 2005/0091391 | A1 | 4/2005 | Burton et al. |
| 2005/0132248 | A1 | 6/2005 | Lecrone et al. |
| 2005/0154786 | A1 | 7/2005 | Shackelford |

FOREIGN PATENT DOCUMENTS

| | | |
|---|---|---|
| EP | 1349088 | 10/2003 |

OTHER PUBLICATIONS

Kubiatowicz, J. et al. "OceanStore: An Architecture for Global-Scale Persistent Storage", ASPLOS 2000, Cam Nov. 12-15, 2000, pp. 190-201.

Mesnier, M. et al., "Object-Based Storage", IEEE Communications Magazine, vol. 41, Issue 8, Aug. 2003, pp. 84-90.

Ng, T., "Propagating Updates in Highly Replicated Database", ICDE 1990, Los Angeles, CA, Feb. 5-9, 1990, pp. 529-536.

Son, S., "Replicated Data Mangement in Distributed Systems", ACM SIGMOD Record, vol. 17, Issue 4, Dec. 1988, pp. 62-69.

Amiri et al., "Highly Concurrent Shared Storage", Proceedings of the 20th International Conference on Distributed Computing Systems, Taipei, Taiwan, Apr. 10-13, 2000, pp. 298-307.

Azagury et al., "Advanced Functions for Storage Subsystems: Supporting Continuous Availability" IBS Systems Journal, vol. 42, No. 2, May 1, 2003 (Internet Publication), pp. 268-279.

Bhargava, Bharat "Concurrency Control in Database Systems", IEEE Transactions on Knowledge and Data Engineering, vol. 11, No. 1, Jan./Feb. 1999, pp. 3-16.

Breitbart et al. "Update Propagation Protocols for Replicated Databases", SIGMOD '99, Philadelphia, PA May 31-Jun. 3, 1999, pp. 97-108.

Preguica, Nuno, et al., "Flexible Data Storage for Mobile Collaborative Applications", ERSADS '99 Apr. 1999, pp. 1-7.

Saito, Yaushi, et al., "Taming Aggressive Replication in the Pangaea Wide-Area File System", ACM SIGOPS Operating Systems Review, Special Issue on Decentralized Storage Systems, vol. 36, Issue SI, Winter 2002, pp. 15-30.

International Search Report and Written Opinion mailed May 31, 2005 for PCT/EP2005/050065, filed Jul. 1, 2005.

McLean, Thorn, et al., "Applying Temporal Databases to HLA Data Collection and Analysis", Proceedings of the 1998 Winter Simulation Conference, vol. 1, Washington DC, Dec. 13-16, 1998, pp. 827-833.

* cited by examiner

MAINTAINING CONSISTENCY FOR REMOTE COPY USING VIRTUALIZATION

CROSS-REFERENCE TO RELATED APPLICATIONS

This application is a continuation of application Ser. No. 10/754,231 filed on Jan. 9, 2004, which is incorporated herein by reference in its entirety.

Application Ser. No. 10/754,231 filed on Jan. 9, 2004, now, U.S. Pat. No. 7,478,211 was related to the following commonly-assigned patent application filed on the same date as the filing date of application Ser. No. 10/754,231, and which is incorporated herein by reference in its entirety: "Ordering Updates in Remote Copying of Data," having application Ser. No. 10/754,740.

BACKGROUND OF THE INVENTION

1. Field

The present disclosure relates to a method, system, and an article of manufacture for maintaining consistency for asynchronous remote copy using virtualization.

2. Description of the Related Art

Information technology systems, including storage systems, may need protection from site disasters or outages. Furthermore, information technology systems may require features for data migration, data backup, or data duplication. Implementations for disaster or outage recovery, data migration, data backup, and data duplication may include mirroring or copying of data in storage systems. In certain information technology system, data is copied from a primary storage control to a secondary storage control. In response to the primary storage control being unavailable, the secondary storage control may be used to substitute the unavailable primary storage control.

Data copying in information technology systems may be synchronous or asynchronous. Synchronous copying involves sending data from the primary storage control to the secondary storage control and confirming the reception of such data before completing write operations to the primary storage control. Synchronous copy, therefore, slows the write operation response time while waiting for the confirmation from the secondary storage control. Synchronous copy, however, provides sequentially consistent data at the secondary storage control.

Asynchronous copy may provides better performance than synchronous copy because the write operation to the primary storage control may be completed before the reception of sent data is confirmed from the secondary storage control. However, data sequence consistency may have to be ensured since data received at the secondary storage control may not be in order of the updates, i.e., write operations, to the primary storage control. In asynchronous copy, cross-device consistency between the primary and the secondary storage control may be achieved by storing updates temporarily in a hardened location, such as a journal dataset, until a set of consistent updates is available to apply to the secondary storage associated with the secondary storage control.

SUMMARY OF THE PREFERRED EMBODIMENTS

Provided are a method, system, and article of manufacture for copying storage, wherein a first unit receives data updates from a second unit. The data updates are stored in a plurality of physical storage locations associated with the first unit. Links are generated to at least one of the plurality of physical storage locations to achieve consistent data between the first unit and the second unit.

In additional embodiments, the first unit is a secondary storage control coupled to a secondary storage and the second unit is a primary storage control coupled to a primary storage, wherein the plurality of physical storage locations are associated with the secondary storage, and wherein the data updates are received asynchronously at the first unit.

In further embodiments, the received data is stored only once in the plurality of physical storage locations associated with the first unit, and unlinked physical storage locations are released to be used for storing subsequent data updates.

In yet additional embodiments, an application sends input/output requests to the second unit, wherein the data updates correspond to output requests from the application, and wherein the data updates are stored only once at the first unit, wherein the first unit can substitute the second unit in responding to the input/output requests from the application at any point in time, and wherein data in the first and second units are consistent at all points in time.

In yet further embodiments, a determination is made as to whether the stored data updates form a consistency group, prior to generating the links. A waiting is performed to receive a next data update in response to the stored data updates not forming a consistency group.

In yet additional embodiments, a determination is made as to whether the stored data updates form a consistency group, prior to generating the links. A determination is made of the at least one physical storage location that commits the consistency group, wherein virtual storage associated with the first unit links to the determined at least one physical storage location.

In further embodiments, a data structure that maps virtual storage locations to the at least one of the plurality of physical storage locations is maintained, wherein the generated links are associated with the data structure, and wherein a plurality of applications are capable of performing input/output operations with the virtual storage locations.

In additional embodiments, data structures representing consistency groups corresponding to the data updates are maintained, wherein the maintained data structures are capable of pointing to the plurality of physical storage locations. A deletion is performed on a first data structure that represents a first consistency group in response to first data updates associated with the first consistency group being committed.

In further embodiments, an error is received, at the first unit, in response to waiting for a data update. The generated links are modified to reflect consistent data between the first unit and the second unit.

Certain embodiments achieve consistency for asynchronous remote copy using a virtual storage system. A replication management application writes data that has been received but that is not yet consistent with data associated with other storage controls into unused physical storage. In response to data necessary to provide consistency being received, virtualization tables may be updated at the true secondary locations to point to locations in the physical storage where the data has been written. In certain embodiments, the received data at a secondary storage control may be written only once to the physical storage associated with the secondary storage control.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Figure 1:
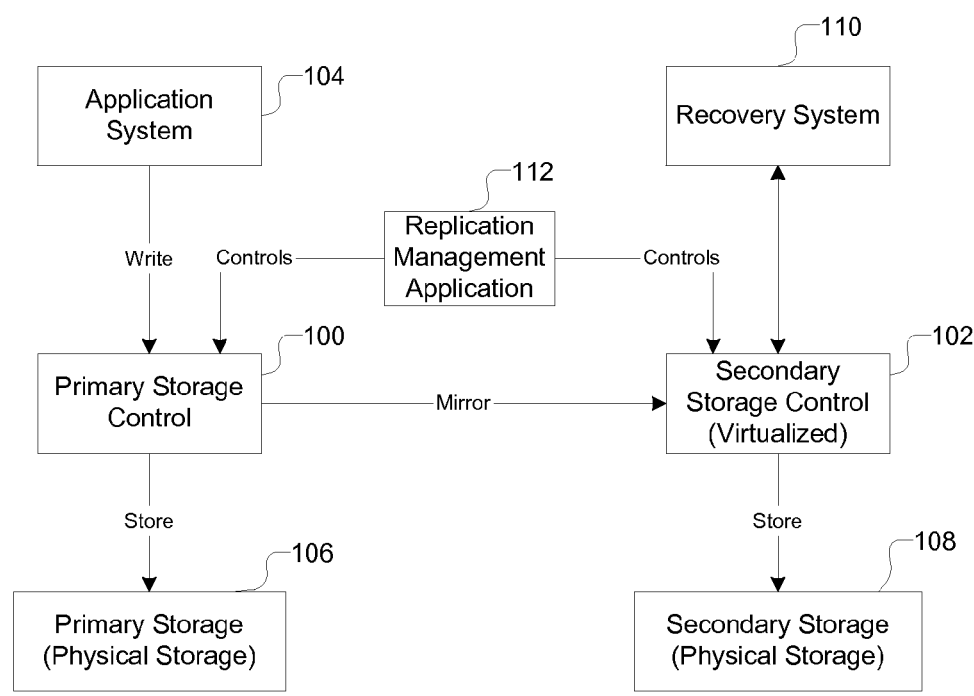
FIG. 1 illustrates a block diagram of a computing environment, in accordance with certain described aspects of the invention.

FIG. 1 illustrates a block diagram of a computing environment, in accordance with certain aspects of the invention. A primary storage control 100 is coupled to a secondary storage control 102. An application system 104 that includes one or more applications may perform I/O operations, including write operations, to the primary storage control 100. In certain embodiments the application system 104 may reside in a host computational device that is coupled to the primary storage control 100 via a host bus adapter.

The primary storage control 100 and the secondary storage control 102 may store and retrieve data from a primary storage 106 and a secondary storage 108 respectively, where the primary storage 106 is coupled to the primary storage control 100 and the secondary storage 108 is coupled to the secondary storage control 102. Additionally, the primary storage control 100 and the secondary storage control 102 may control the operations of the primary storage 106 and the secondary storage 108 respectively. The primary storage 106 and the secondary storage 108 may include non-volatile storage, such as, hard disk drives, RAIDs, direct access storage devices, or other types of physical storage.

In certain embodiments, the primary storage control 100 may not be operational and data associated with the secondary storage control 102 may be used by a recovery system 110 for processing. In embodiments of the invention, data associated with the secondary storage control 102 is maintained consistent with data associated with the primary storage control 100. The consistency is maintained by a replication management application 112.

The replication management application 112 is coupled to the primary storage control 100 and the secondary storage control 102 and in certain embodiments may mirror data from the primary storage control 100 to the secondary storage control 102. In some embodiments, the mirroring may be performed by copying data asynchronously from the primary storage control 100 to the secondary storage control 102.

In certain embodiments, the replication management application 112 may be spread across the primary storage control 100 and the secondary storage control 102. In other embodiments, the replication management application 112 may reside on a separate system that is different from the primary storage control 100 and the secondary storage control 102. In yet additional embodiments, the replication management application 112 may reside in only one of the primary storage control 100 and the secondary storage control 102.

In certain embodiments, the replication management application 112 maintains consistency of data updates received from the application system 104, where the data updates are asynchronously copied to the secondary storage control 102 from the primary storage control 100. The replication management application 112 may perform a virtualization of the secondary storage 108 that is coupled to the secondary storage control 102 to maintain the consistency of data across the primary storage control 100 and the secondary storage control 102. In certain embodiments, virtualization includes the mapping of the physical secondary storage 108 to virtual volumes.

Therefore, FIG. 1 illustrates an embodiment where the replication management application 112 virtualizes the secondary storage control 102 and maintains consistency of data across the primary storage control 100 and the secondary storage control 102, where data is copied asynchronously from the primary storage control 100 to the secondary storage control 102.

Figure 2:
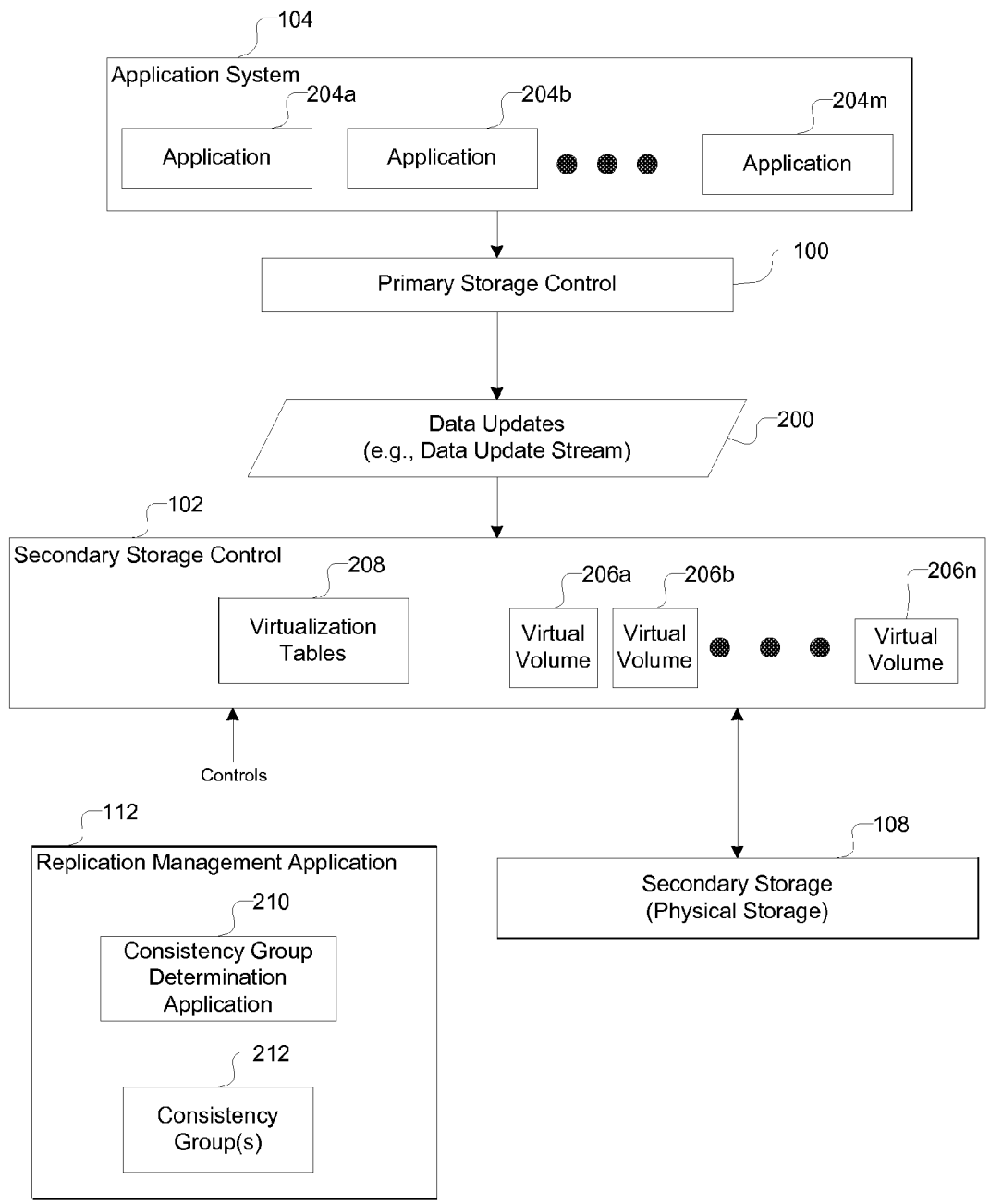
FIG. 2 illustrates a block diagram of data structures and devices related to the computing environment, in accordance with certain described implementations of the invention.

FIG. 2 illustrates a block diagram of data structures and devices related to the replication management application 112 and the secondary storage control 102, in accordance with certain described implementations of the invention.

The secondary storage control 102 may receive data updates 200 generated as a result of write operations from one or more applications 204a . . . 204m to the primary storage control 100, where the one or more applications 204a . . . 204m may comprise the application system 104. In certain embodiments, the data updates 200 from the application system 104 arrive asynchronously at the secondary storage control 102 via the primary storage control 100 and the data updates 200 may be referred to as a data update stream.

The replication management application 112 creates one or more virtual devices, such as, virtual volumes 206a . . . 206n associated with the secondary storage control 102. The primary storage control 100 may also have virtual volumes that correspond to the virtual volumes 206a . . . 206n. In certain embodiments, the data corresponding to the virtual volumes 206a . . . 206n are stored in locations in the physical secondary storage 108. The mapping of the virtual volumes 206a . . . 206n to locations in the physical secondary storage 108 may be stored in virtualization tables 208 associated with the secondary storage control 102. In certain embodiments, the virtualization tables 208 may be coupled to the virtual volumes 206a ... 206n.

The application system 104 performs I/O operations with respect to virtual volumes associated with the primary storage control 100 and corresponding virtual volumes 206a ... 206n are also associated with the secondary storage control 102.

In certain embodiments, the replication management application 112 may include a consistency group determination application 210, and associated data structures corresponding to consistency groups 212.

Therefore, FIG. 2 describes an embodiment where the replication management application 112 virtualizes the secondary storage control 100 and maintains data consistency across the primary storage control 100 and the secondary storage control 102.

Figure 3:
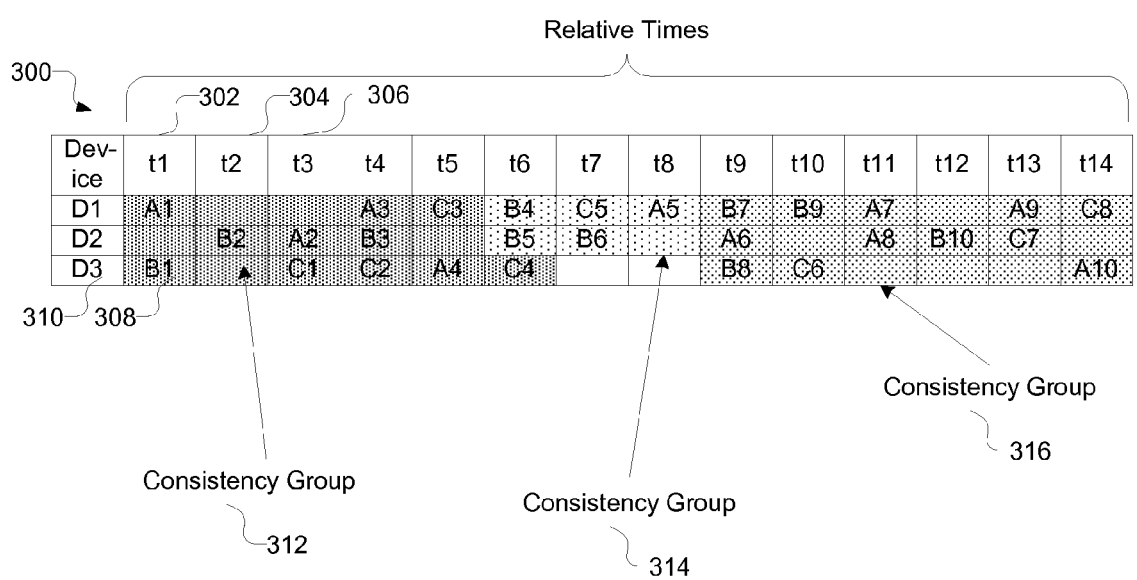
FIG. 3 illustrates a block diagram of consistency groups, in accordance with certain described implementations of the invention.

FIG. 3 illustrates a block diagram of exemplary consistency groups created by the replication management application 112, in accordance with certain described implementations of the invention.

A consistency group is a set of updates in which the updates may span a plurality of storage volumes, and where the updates must be written together in order to maintain mutual data consistency between the data contained in each storage volume of the plurality of storage volumes. To provide a non-limiting example, a first command copies volume A1 associated with the primary storage control 100 to volume B1 associated with the secondary storage control 102 and a second command copies volume A2 associated with the primary storage control to volume B2 associated with the secondary storage control. It is required that volumes B1 and B2 should represent a consistent state of the dataset in volumes A1 and A2 at a certain point in time. In a certain sequence of operations on the volumes the following set of dependent write operations by the application system 104 may occur (where the second operation occurs after the first operation):

1. Write to dataset on volume A1 (data updated)

2. Write to dataset on volume A2 (data updated)

When volumes A1 and A2 are asynchronously copied to volumes B1 and B2 respectively via the data updates 200, then the following non-limiting example of a sequence of operations may create an inconsistent state in volumes B1, B2 with respect to volumes A1, A2.

1. Copy volume A1 to volume B1

2. Write to dataset on volume A1 (data updated)

3. Write to dataset on volume A2 (data updated)

4. Copy volume A2 to volume B2

At the conclusion of all the copy operations, i.e., the conclusion of the fourth operation, volume B2 contains the data update of volume A2 whereas volume B1 does not contain the data update of volume A1. The set of volumes B1, B2 are in an inconsistent state with respect to the set of volumes A1, A2. An application 204a ... 204m that uses the volumes B1, B2 associated with the secondary storage control 102 could not recover from a back-up copy stored in the volumes B1, B2.

Therefore, not all sequence data updates can form a consistent set of data updates. In FIG. 3, the rows of table 300 represent different devices and the columns represent different times. The times are relative times and not absolute times. For example, t3 (reference numeral 306) is a time after t2 (reference numeral 304), and t2 (reference numeral 304) is a time after t1 (reference numeral 302). A letter-number combination in the body of the table 300 identifies an update to a device at a time, with the letter identifying an application and the number a sequence of updates for the application. For example, B1 (reference numeral 308), is the first data update from an application named B, where the update is for the device D3 (reference numeral 310) that arrives at relative time t1 (reference numeral 302). The different shadings in the entries of the table 300 identify a data-consistent set of updates, and may not necessarily be just vertical slices of entries in the table. For example, the table 300 has three consistency groups 312, 314, 316. The update data in a consistency group may need to be applied together to the secondary control 102 for data associated with the secondary control 102 to remain consistent with data associated with the primary control 100. The determination of consistency groups 312, 314, 316 in the table 300 may be performed in any manner known in the art.

Therefore, FIG. 3 illustrates an embodiment of exemplary consistency groups 312, 314, 316 that may be generated by the replication management application 112 by processing the data update stream 200 that arrives asynchronously at the secondary storage control 102 from the primary storage control 100. For preserving data consistency with the primary storage control 102, first a consistency group is determined and committed, and then the data updates of the consistency group are reflected via pointers or links in the virtual volumes 206a ... 206n of the secondary storage control 108.

Figure 4:
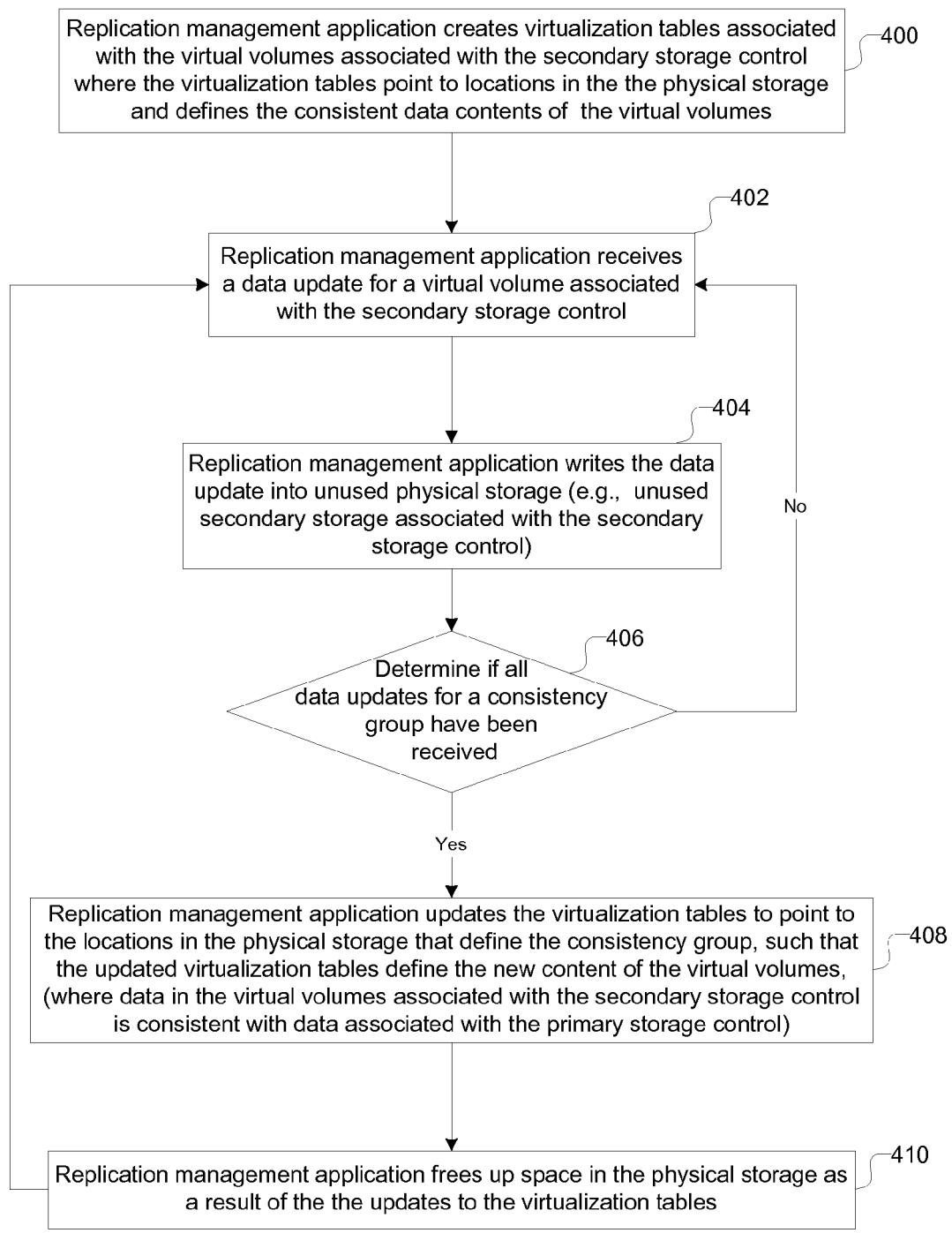
FIG. 4 illustrates logic for maintaining consistency using virtualization, in accordance with certain described implementations of the invention.

FIG. 4 illustrates logic for maintaining consistency using virtualization as implemented in the secondary storage control 102 in accordance with certain described implementations of the invention.

Control starts at block 400, where the replication management application 112 creates virtualization tables 208 corresponding to the virtual volumes 206a ... 206n associated with the secondary storage control 102, where the virtualization tables 208 point to locations in the physical storage 108 and may define the consistent data contents of the virtual volumes 206a ... 206n. The consistency of the data contents of the virtual volumes 206a ... 206n is with respect to the data contents associated with the primary storage control 100.

The replication management application 112 receives (at block 402) a data update 200 for a virtual volume 206a ... 206n associated with the secondary storage control 102. For example, in certain embodiments the data update 200 may be the data update B1 (reference numeral 308).

The replication management application 112 writes (at block 404) the data update 200 into unused physical storage. For example, the replication management application 112 may write the data update 200 into unused locations of the secondary storage 108.

The replication management application 112 determines (at block 406) if all data updates for a consistency group 212, such as, consistency groups 312, 314, 316 have been received. If so, the replication management application 112 updates (at block 408) the virtualization tables 208 to point to the locations in the physical storage 108 that define a commitment of the data updates included in the consistency group 212. The updated virtualization tables 208 define the new data associated with the virtual volumes 206a ... 206n. The data associated with the virtual volumes 206a ... 206n of the secondary storage control 102 is therefore consistent with data associated with the primary storage control 100.

The replication management application 112 frees (at block 410) space in the physical storage 108 as a result of the updates to the virtualization tables 208. For example, certain data updates 200 written into the unused physical storage performed in block 404 may not be needed and may be freed.

The replication management application 112 receives (at block 402) the next data update 200.

If the replication management application 112 determines (at block 406) that all data updates for a consistency group 212, such as, consistency groups 312, 314, 316, have not been received then the replication management application 112 receives (at block 402) the next data update 200.

Therefore, FIG. 4 describes certain embodiments in which the replication management application 112 writes all data updates 200 into locations in unused physical storage 108 and after determining a consistency group 212 may harden only a certain number of the written data updates by updating virtualization tables 208 to point to the certain number of the written data updates. No copying of the written data updates is necessary.

Figure 5:
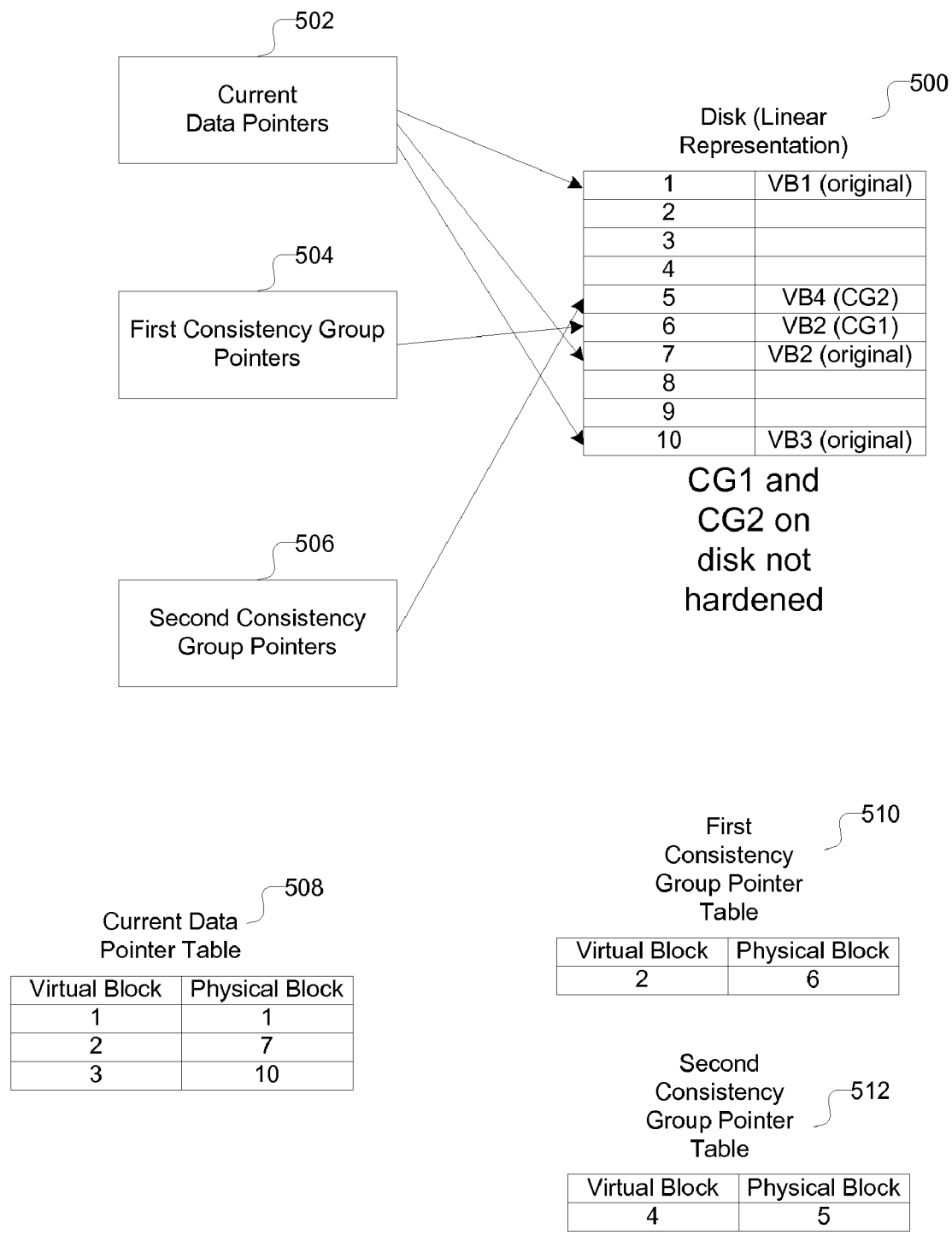
FIG. 5 illustrates a block diagram of a first state of data structures in an exemplary embodiment, in accordance with certain described implementations of the invention.

FIG. 5 illustrates a block diagram of a first state of data structures in an exemplary embodiment, in accordance with certain described implementations of the invention, where original data is associated with the secondary storage control 102 and data updates corresponding to first and second consistency groups have arrived at the secondary storage control 102 but have not been committed.

In FIG. 5 a linear representation of an exemplary disk 500, such as the physical storage 108 is shown. The exemplary disk 500 has ten physical blocks with the first physical block containing a first virtual block (VB) named VB1 that is part of the original data in the disk 500. As data updates 200 arrive and are associated with different consistency groups (CG) the data updates are written into the disk 500. For example, a data update 200 for the fourth virtual block (VB4) which is part of the second consistency group (CG2) is written in physical block five. The virtual blocks correspond to the virtual volumes 206a . . . 206n.

FIG. 5 also illustrates current data pointers 502 that point to the physical blocks of the original data in the disk 500, a first consistency group pointers 504 that point to the physical blocks corresponding the data updates comprising the first consistency group, and a second consistency group pointers 506 that point to the physical blocks corresponding to the data updates comprising the second consistency group.

Tables representing the virtual block to physical block mapping of the pointers 502, 504, 506 are also maintained. For example, current data pointer table 508 illustrates the current mapping of the virtual blocks to the physical blocks in the disk 500. The mapping in the current data pointer table 508 illustrates hardened or committed data, i.e., data that is consistent across the primary storage control 100 and the secondary storage control 102. The applications 204a . . . 204n that access data associated with the secondary storage control 102 work with the data pointed to by the current data pointers 502.

The first consistency group pointer table 510 illustrates the mapping of the virtual blocks to the physical blocks in the disk 500 for data updates that form part of the first consistency group. The data represented in the first consistency group pointer table 510 is not hardened as the first consistency group has not been committed as yet.

Similarly, a second consistency group pointer table 512 illustrates the mapping of the virtual blocks to the physical blocks in the disk 500 for data updates that form part of the second consistency group. The data represented in the second consistency group pointer table 512 is not hardened as the second consistency group has not been committed as yet.

Therefore, FIG. 5 illustrates a first state of data structures in an embodiment where data updates 200 for the first and second consistency groups have arrived at the secondary storage control 102 but have not been committed.

Figure 6:
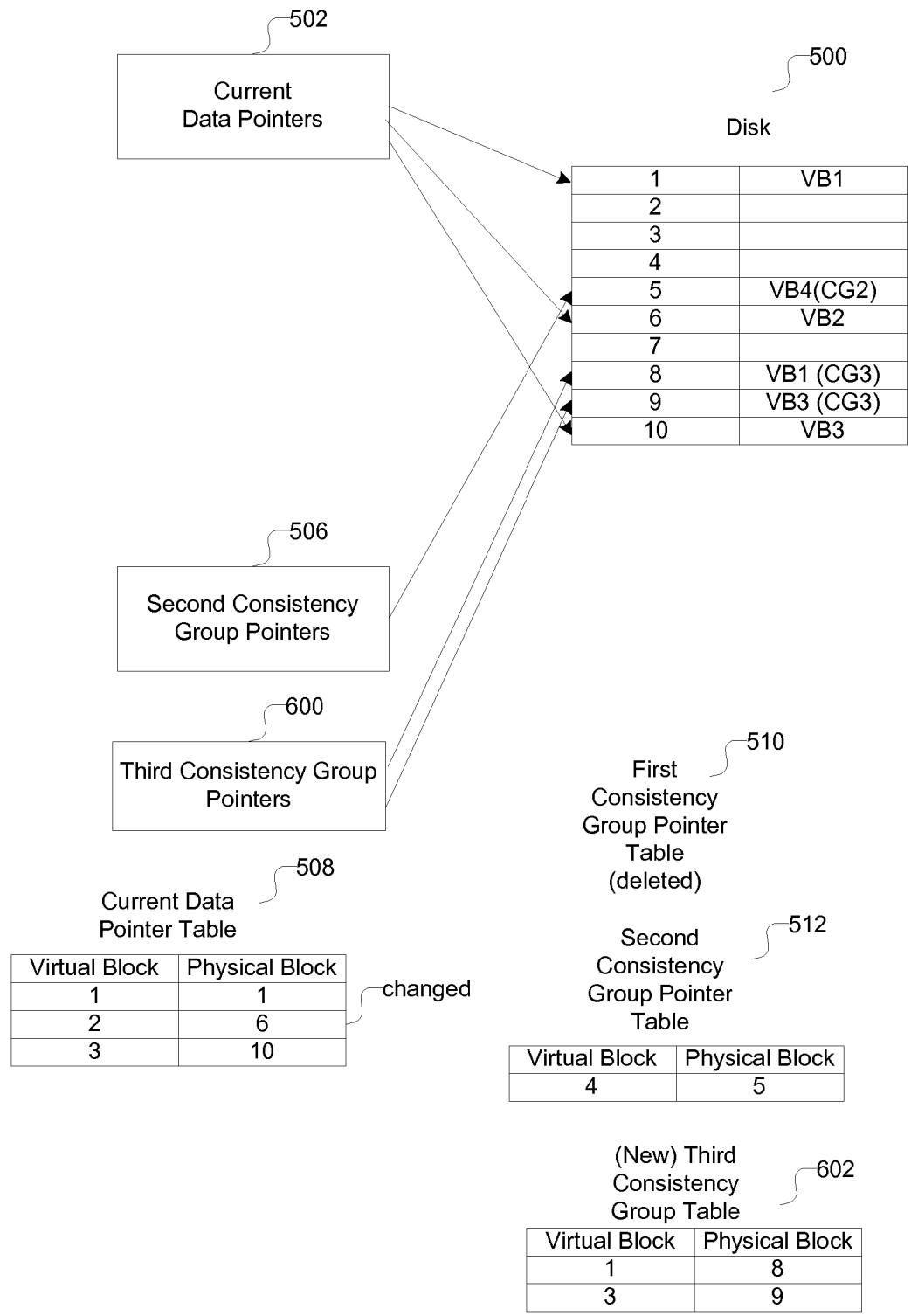
FIG. 6 illustrates a block diagram of a second state of data structures in an exemplary embodiment, in accordance with certain described implementations of the invention.

FIG. 6 illustrates a block diagram of a second state of data structures in an exemplary embodiment, in accordance with certain described implementations of the invention, where the data updates 200 corresponding to the first consistency group pointer table 510 have been hardened, i.e., the first consistency group has been committed, and uncommitted data updates 200 corresponding to a third consistency group have arrived at the secondary storage control 102.

FIG. 6 illustrates the updated current data pointers 502 that point to the physical blocks of the original data in the disk 500, the second consistency group pointers 506 that point to the physical blocks corresponding the data updates comprising the uncommitted second consistency group, and a new third consistency group pointers 600 that point to the physical blocks corresponding to the uncommitted data updates comprising the third consistency group.

Tables representing the virtual block to physical block mapping of the pointers 502, 506, 510 are also maintained. For example, current data pointer table 508 illustrates the current mapping of the virtual blocks to the physical blocks in the disk 500. The mapping in the current data pointer table 508 illustrates hardened or committed data after the date updates 200 of the first consistency group have been committed.

The third consistency group pointer table 602 illustrates the mapping of the virtual blocks to the physical blocks in the disk 500 for data updates that form part of the third consistency group. The data represented in the second consistency group pointer table 512 or the third consistency group pointer table 602 is not hardened as the second and third consistency groups have not been committed as yet. In FIG. 6 the first consistency group pointer table 510 has been deleted as the data updates for the first consistency group have been committed.

Therefore, FIG. 6 illustrates an embodiment where data updates 200 for the first, second and third consistency groups have arrived at the secondary storage control 102 and only the data updates of the first consistency group have been committed.

Figure 7:
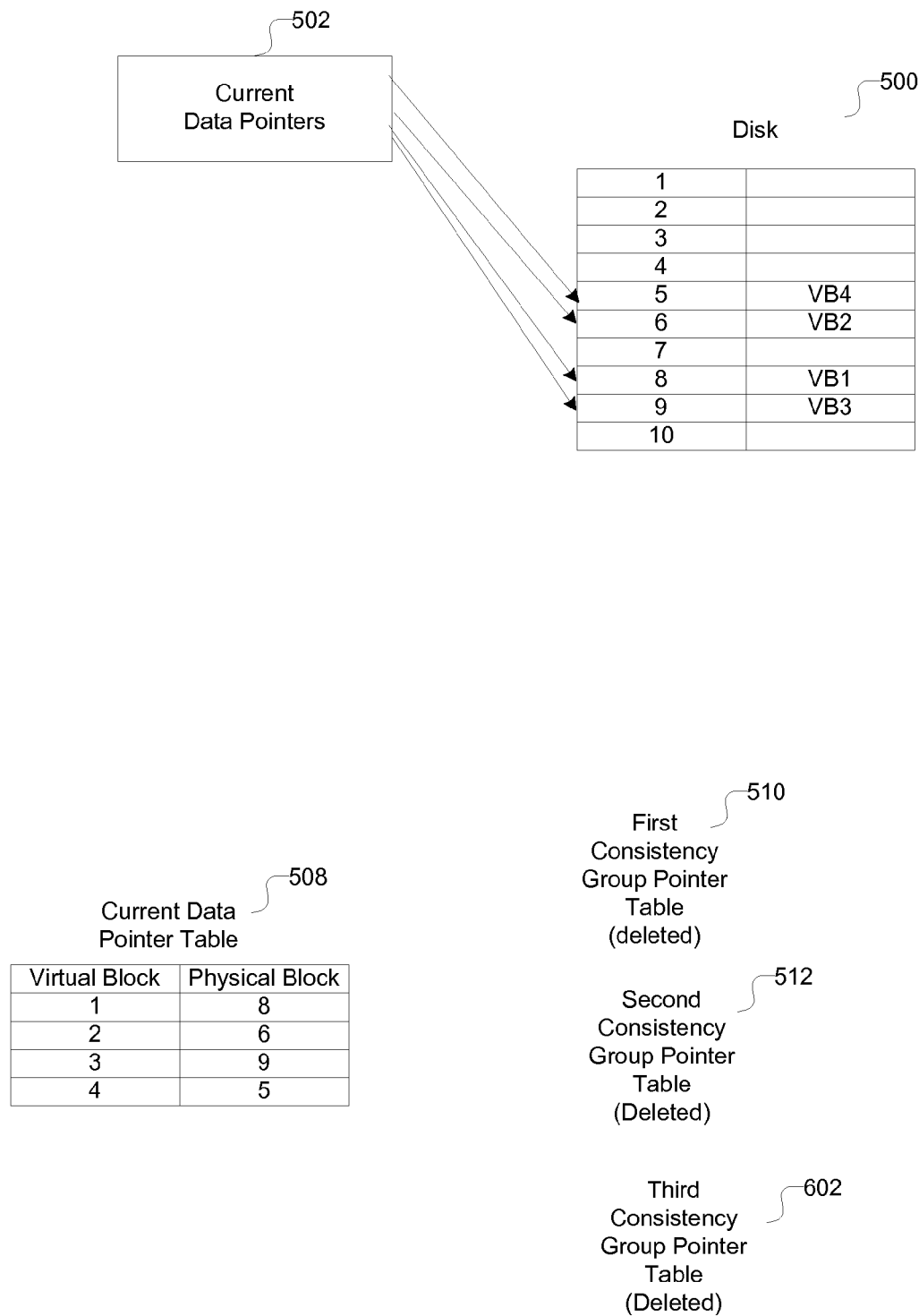
FIG. 7 illustrates a block diagram of a third state of data structures in an exemplary embodiment, in accordance with certain described implementations of the invention.

FIG. 7 illustrates a block diagram of a third state of data structures in an exemplary embodiment, in accordance with certain described implementations of the invention. In FIG. 7 the data updates 200 corresponding to the second and third consistency groups have been committed.

Since the data updates of the first, second and third consistency groups have been committed the first consistency group pointer table 510, the second consistency group pointer table 512, and the third consistency group pointer table 602 are all shown to be deleted. The current data pointers point to physical block 5, 6, 8, 9 of the disk 500 and correspond to virtual block VB4, VB2, VB1, and VB3 respectively.

Therefore, FIG. 7 illustrates an embodiment where data updates 200 for the first, second and third consistency groups have arrived at the secondary storage control 102 and all the data updates have been committed.

Figure 8:
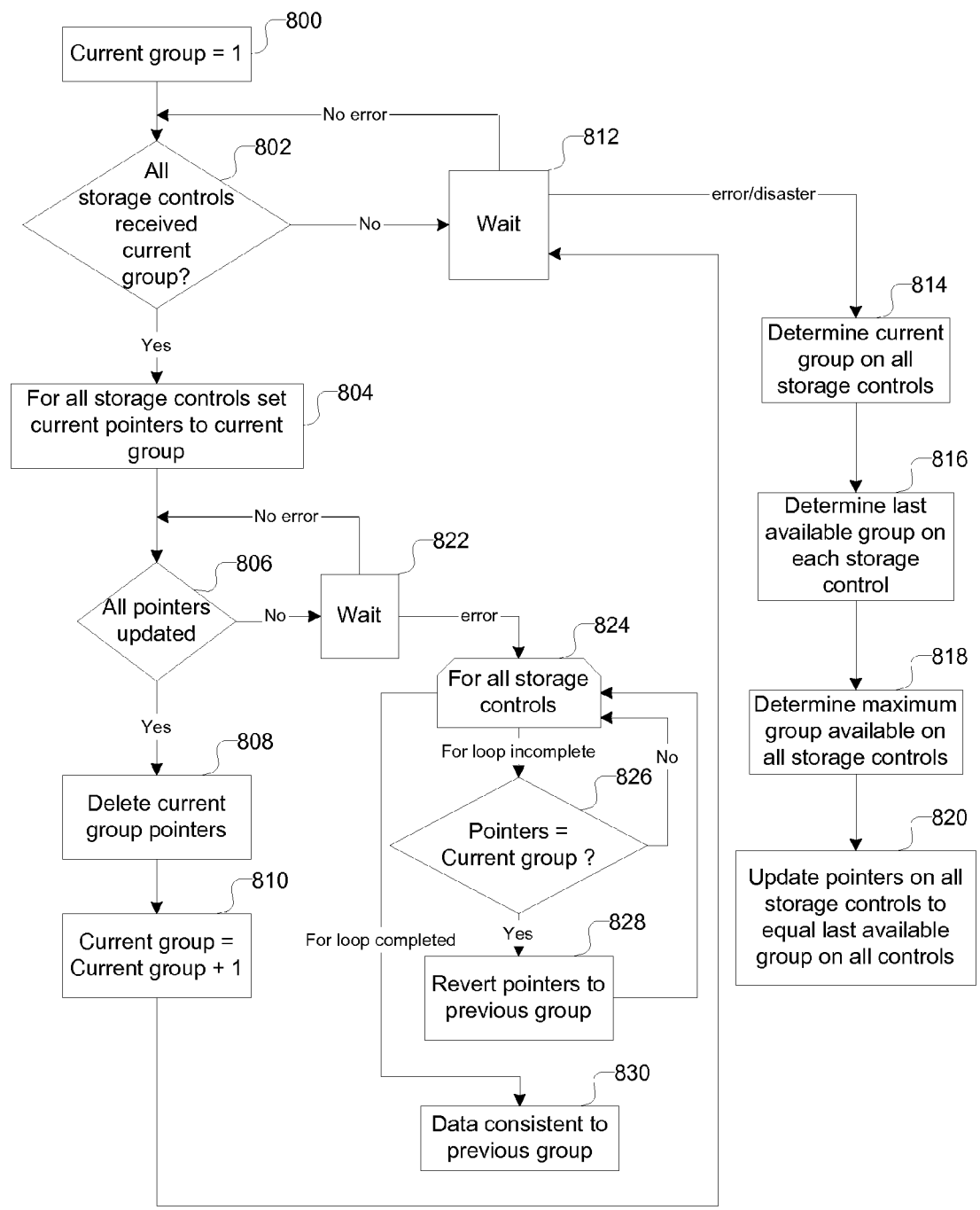
FIG. 8 illustrates logic for logic for maintaining consistency and disaster recovery, in accordance with certain described implementations of the invention.

FIG. 8 illustrates logic for logic for maintaining consistency and disaster recovery implemented in the replication management application 112, in accordance with certain described implementations of the invention.

Control starts at block 800, where a current consistency group is initialized to one. The replication management application 112 determines (at block 802) whether all storage controls, i.e., the primary storage control 100 and the secondary storage control 102, have received the data updates of the current consistency group. If so, the replication management application 112 commits the data updates of the current consistency group and for all storage controls sets (at block 804)

the current pointers to the current consistency group data updates. In certain embodiments, the current pointers may be implemented via data structures associated with the virtualization tables 208 and/or the pointer tables 508, 510, 512, 602.

The replication management application 112 determines (at block 806) whether all pointers have been updated. If so, the replication management application deletes (at block 808) the current consistency group pointers.

The replication management application 112 increments (at block 810) the current consistency group. For example, if in a first iteration of blocks 802 to 808 the data updates of the first consistency group are processed, then in the second iteration of blocks 802 to 808 the data updates of the second consistency group would be processed. The replication management application 112 waits (at block 812) for data updates of the current consistency group to arrive. If there is no error while waiting then control proceeds to block 802 where the replication management application 112 determines if all storage controls have received the data updates for the current consistency group.

If the replication management application 112 determines (at block 802) that all storage controls have not received the data updates of the current consistency group then the replication management application 112 waits (at block 812) for all the data updates of the current consistency group to arrive. If an error or disaster strikes while waiting (at block 812) the replication management application 112 determines (at block 814) the current consistency group on all storage controls and then determines (at block 816) the last available consistency group in each storage control. The replication management application 112 determines (at block 818) the maximum consistency group available on all storage controls and then updates (at block 820) pointers on all storage controls to correspond to the last available consistency group on all storage controls.

If the replication management application 112 determines (at block 806) that all pointers have not been updated then the replication management application 112 waits (at block 822) for all pointers to be updated. If there is no error while waiting, then control returns to block 806 where the replication management application 112 determines if all pointers have been updated.

If there is an error while waiting (at block 822) then the replication management application 112 begins performing (at block 824) a FOR loop for all the storage controls. The control for the FOR loop is executed (at block 824) for one storage control in every iteration. If the FOR loop is incomplete, i.e., not all storage controls have been processed, the replication management application 112 determines (at block 826) if the pointers correspond to the current consistency group for the storage control being processed. If so, then the replication management application 112 reverts (at block 828) the pointers to correspond to the previous consistency group and control proceeds (at block 824) to the next iteration of the FOR loop with the next storage control.

If the pointers do not correspond (at block 826) to the current consistency group then control proceeds (at block 824) to the next iteration of the FOR loop with the next storage control. At the conclusion of the FOR loop (at block 830) the data in the storage controls is consistent with respect to the previous consistency group.

Therefore, the logic of FIG. 8 maintains the data on all storage controls consistent with each other and furthermore in the event of an error or disaster impacting a storage control while updating pointers or receiving data updates may revert the pointers in the storage controls to reflect the data updates associated with an earlier processed consistency group, such that data in the storage controls are consistent with each other.

These embodiments achieve consistency for asynchronous remote copy by virtualizing storage systems. A replication management application writes data that has been received but that is not yet consistent with data in other storage subsystems into unused physical storage. In response to data necessary to provide consistency being received, pointers and tables may be updated at the true target locations to point to locations in the physical storage where the data has been written.

Therefore, the embodiments do not require a two phase commit at the secondary storage control to ensure data consistency. In a two phase commit the data updates may be written into a journal dataset associated with the secondary storage control in a first phase and the appropriate data updates may copied in a second phase when the consistency group is committed. The embodiments are implemented without using a journal dataset. In response to a consistency group being committed, pointers are adjusted to point to appropriate locations in physical storage, such that the adjusted pointers represent a consistent data set across all storage controls.

Additionally, in the event of an error or disaster while updating pointers or waiting for data updates, the embodiments may adjust the pointers in the storage controls to reflect the data updates associated with an earlier processed consistency group, such that the data in the storage controls are consistent with each other.

Furthermore, since the data updates may be kept in disk there is a lesser constraint on space utilization or volatility than if the data updates are kept in a cache. Additionally, only enough extra disk space is needed to contain updates for the number of consistency groups which are in progress at one time.

Moreover, since no data updates are physically overwritten, in certain embodiments it may be possible to maintain or revert back to multiple previous versions of consistent data sets in the storage controls.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 9:
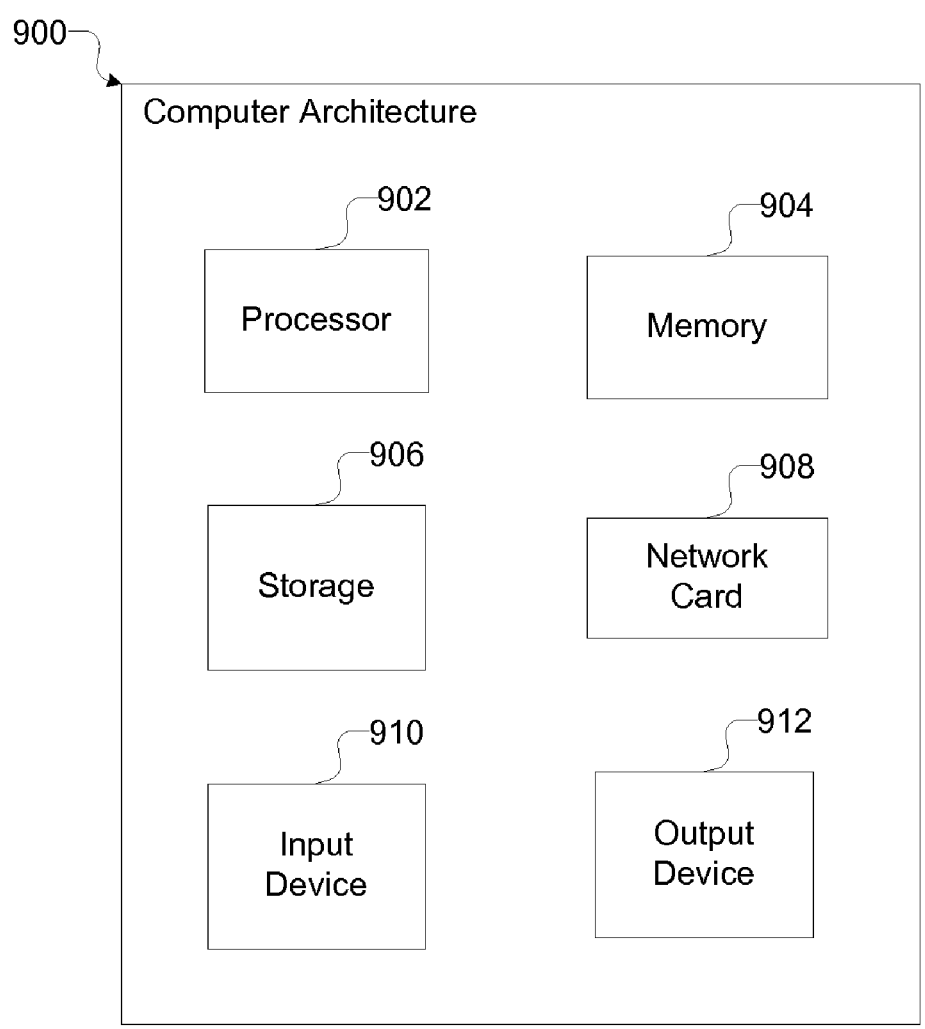
FIG. 9 illustrates a block diagram of a computer architecture in which certain described aspects of the invention are implemented.

FIG. 9 illustrates a block diagram of a computer architecture in which certain aspects of the invention are implemented. FIG. 9 illustrates one implementation of the storage controls 100, 102, a host that includes the application system 104, and any computational device that includes the replication management application 112. The storage controls 100, 102, the host that includes the application system 104, and any computational device that includes the replication management application 112 may implement a computer architecture 900 having a processor 902, a memory 904 (e.g., a volatile memory device), and storage 906 (e.g., a non-volatile storage, magnetic disk drives, optical disk drives, tape drives, etc.). The storage 906 may comprise an internal storage device, an attached storage device or a network accessible storage device. Programs in the storage 906 may be loaded into the memory 904 and executed by the processor 902 in a manner known in the art. The architecture may further include a network card 908 to enable communication with a network. The architecture may also include at least one input device 910, such as a keyboard, a touchscreen, a pen, voice-activated input, etc., and at least one output device 912, such as, a display device, a speaker, a printer, etc.

FIGS. 4-8 describe specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes.

Although the embodiments as written with respect to an asynchronous peer to peer remote copy, additional embodiments may be used where a two-phase commit is required for copying. For example, if a database log and table space are both contained with the same virtualization engine, transactions can be written to the log and then the commit can be accomplished using the virtualization described in the embodiments. There may be a performance improvement for the processing of the data base because there is no need to transfer the data to storage for the commit.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A system for copying storage, comprising:
a memory; and
a processor coupled to the memory, wherein the processor performs operations, the operations comprising:
receiving, at a first unit, data updates from a second unit;
storing the data updates in a plurality of physical storage locations associated with the first unit, wherein the received data updates are stored only once in the plurality of physical storage locations associated with the first unit; and
generating links to at least one of the plurality of physical storage locations to achieve consistent data between the first unit and the second unit, wherein the operations further comprise:
(i) determining if the stored data updates form a consistency group, prior to generating the links, wherein the consistency group is a set of data updates in which the set of data updates corresponds to a plurality of storage volumes, wherein the set of data updates must be written together in order to maintain mutual data consistency among data included in each storage volume of the plurality of storage volumes;
(ii) determining the at least one physical storage location that commits the consistency group, wherein virtual storage associated with the first unit links to the determined at least one physical storage location, wherein a consistency group pointer table includes entries for a virtual block and a physical block; and
(iii) releasing unlinked physical storage locations to be used for storing subsequent data updates, wherein the first unit is a secondary storage control, wherein the second unit is a primary storage control, wherein the secondary storage control and the primary storage control comprise a plurality of storage controls, and wherein in response to receiving an error while waiting for all links to be updated, performing for each storage control of the plurality of storage controls being processed:
(a) determining, by a replication management application, if selected links correspond to a current consistency group for the storage control being processed; and
(b) reverting the selected links to correspond to a previous consistency group, in response to determining by the replication management application that the selected links correspond to the current consistency group for the storage control being processed.

2. The system of claim 1, wherein the secondary storage control is coupled to a secondary storage and the primary storage control is coupled to a primary storage, wherein the plurality of physical storage locations are associated with the secondary storage, and wherein the data updates are received asynchronously at the first unit.

3. The system of claim 1, wherein an application sends input/output requests to the primary storage control, wherein the data updates correspond to output requests from the application, and wherein the data updates are stored only once at the secondary storage control, wherein the secondary storage control can substitute the primary storage control in responding to the input/output requests from the application at any point in time, and wherein data in the primary and secondary storage controls are consistent at all points in time.

4. The system of claim 1, further comprising:
maintaining a data structure that maps virtual storage locations to the at least one of the plurality of physical storage locations, wherein the generated links are associated with the data structure, and wherein a plurality of applications are capable of performing input/output operations with the virtual storage locations, wherein a plurality of consistency group pointers, consistency group pointer tables, and relative times for data updates are maintained.

5. The system of claim 1, further comprising:

maintaining data structures representing consistency groups corresponding to the data updates, wherein the maintained data structures are capable of pointing to the plurality of physical storage locations, wherein a plurality of consistency group pointers, consistency group pointer tables, and relative times for data updates are maintained; and deleting a first data structure that represents a first consistency group in response to first data updates associated with the first consistency group being committed.

6. A computer readable storage medium including code for copying to a first unit from a second unit, wherein the code when executed by a machine is capable of causing operations, the operations comprising:

receiving, at the first unit, data updates from the second unit;

storing the data updates in a plurality of physical storage locations associated with the first unit, wherein the received data updates are stored only once in the plurality of physical storage locations associated with the first unit; and generating links to at least one of the plurality of physical storage locations to achieve consistent data between the first unit and the second unit, wherein the operations further comprise:

(i) determining if the stored data updates form a consistency group, prior to generating the links, wherein the consistency group is a set of data updates in which the set of data updates corresponds to a plurality of storage volumes, wherein the set of data updates must be written together in order to maintain mutual data consistency among data included in each storage volume of the plurality of storage volumes;

(ii) determining the at least one physical storage location that commits the consistency group, wherein virtual storage associated with the first unit links to the determined at least one physical storage location, wherein a consistency group pointer table includes entries for a virtual block and a physical block; and (iii) releasing unlinked physical storage locations to be used for storing subsequent data updates, wherein the first unit is a secondary storage control, wherein the second unit is a primary storage control, wherein the secondary storage control and the primary storage control comprise a plurality of storage controls, and wherein in response to receiving an error while waiting for all links to be updated, performing for each storage control of the plurality of storage controls being processed:

(a) determining, by a replication management application, if selected links correspond to a current consistency group for the storage control being processed; and (b) reverting the selected links to correspond to a previous consistency group, in response to determining by the replication management application that the selected links correspond to the current consistency group for the storage control being processed.

7. The computer readable storage medium of claim 6, wherein the secondary storage control is coupled to a secondary storage and the primary storage control is coupled to a primary storage, wherein the plurality of physical storage locations are associated with the secondary storage, and wherein the data updates are received asynchronously at the first unit.

8. The computer readable storage medium of claim 6, wherein an application sends input/output requests to the primary storage control, wherein the data updates correspond to output requests from the application, and wherein the data updates are stored only once at the secondary storage control, wherein the secondary storage control can substitute the primary storage control in responding to the input/output requests from the application at any point in time, and wherein data in the primary and secondary storage controls are consistent at all points in time.

9. The computer readable storage medium of claim 6, further comprising:

maintaining a data structure that maps virtual storage locations to the at least one of the plurality of physical storage locations, wherein the generated links are associated with the data structure, and wherein a plurality of applications are capable of performing input/output operations with the virtual storage locations, wherein a plurality of consistency group pointers, consistency group pointer tables, and relative times for data updates are maintained.

10. The computer readable storage medium of claim 6, further comprising:

maintaining data structures representing consistency groups corresponding to the data updates, wherein the maintained data structures are capable of pointing to the plurality of physical storage locations, wherein a plurality of consistency group pointers, consistency group pointer tables, and relative times for data updates are maintained; and deleting a first data structure that represents a first consistency group in response to first data updates associated with the first consistency group being committed.

* * * * *